Dec. 5, 1967 TOSHIO MISAWA 3,356,866

APPARATUS EMPLOYING AVALANCHE TRANSIT TIME DIODE

Filed Aug. 17, 1966

INVENTOR
T. MISAWA
BY
A. J. Torsiglieri
ATTORNEY

United States Patent Office 3,356,866

Patented Dec. 5, 1967

3,356,866

APPARATUS EMPLOYING AVALANCHE TRANSIT TIME DIODE

Toshio Misawa, Murray Hill, N.J., assignor to Bell Telephone Laboratories, Incorporated, Murray Hill, N.J., a corporation of New York Filed Aug. 17, 1966, Ser. No. 572,994
5 Claims. (Cl. 307—88.5)

ABSTRACT OF THE DISCLOSURE

A NINIPIP diode is operated as an impact avalanche transit time device to provide a negative resistance.

This invention relates to semiconductive apparatus for providing a negative resistance effect at short wavelengths.

More particularly, this invention relates to a semiconductive device of the kind now usually described as an impact ionization avalanche transit time diode, the general principles of which are described in United States Patents 2,899,664 and 2,899,652, which issued to W. T. Read, Jr., on Aug. 11, 1959.

It is characteristic of such a diode that it employs a multizone semiconductive element which includes an avalanche region and a drift region intermediate between cathode and anode terminal portions, and that a dynamic negative resistance is achieved by introducing an appropriate transit time to avalanching carriers in their travel across the drift region. In such a diode, it was originally deemed advantageous to utilize a semiconductive element designed to have an avalanche region short relative to the drift region. Consideration of this kind led to the use of semiconductive elements having a PNIP or NPIN resistivity profile, where N and P denote n-type and p-type material and I denotes relatively higher resistivity material, although not necessarily intrinsic conductivity material. Subsequently, as is described in copending application Ser. No. 550,547, filed May 16, 1966, having a common assignee, it was discovered that in such diodes the efficiency might be enhanced to some extent if the diode incorporated a semiconductive element in which the avalanche region was an appreciable part of the interval between the cathode and anode terminal portions. Such considerations call for a PININ or NIPIP resistivity profile for the semiconductive element.

However, with such a structure, widening of the avalanche region results in a larger share of the applied voltage dropping across the avalanche region which eventually results in a lowering of efficiency, so that this expedient for increasing the efficiency has its limitations.

Still another form of avalanche impact ionization transit time diode is described in copending application Ser. No. 433,088, filed Feb. 16, 1965, and having a common assignee. This form utilizes a semiconductive element having a PIN resistivity profile, and in such a diode the avalanche region extends over most of the interval between the cathode and anode portions. However, such a diode can exhibit the negative resistance effect from a high frequency down to D-C. As a consequence, the frequency of such a diode can become very difficult to stabilize, particularly because of the presence of the D-C biasing circuit.

The present invention relates to an avalanche impact ionization transit time diode wherein the disadvantages of the various prior art forms described are reduced. In particular, in an illustrative embodiment of the invention, the diode comprises a mutizone semiconductive element which has a PIPININ resistivity profile where I denotes a zone of relatively higher resistivity, typically at least a factor of ten. Such a diode has the advantage that the negative resistance effect is cut off at low frequencies whereby the problem of frequency stabilization is eased. Additionally, it is characteristic of such a structure that both types of carriers can be used in providing the negative resistance effect. In particular, if the transit times of the two types of carriers through the active regions are made substantially equal, each type of carrier contributes to the negative resistance effect whereby the overall efficiency is enhanced.

This invention will be better understood from the following more detailed description taken in conjunction with the accompanying drawing, in which.

Figure 1:
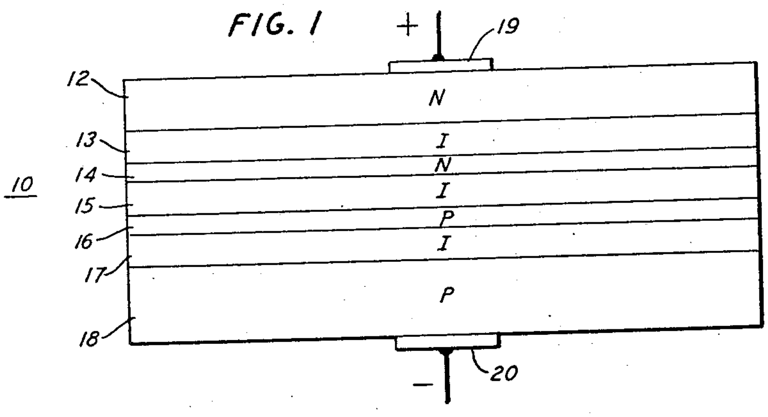
FIG. 1 shows a diode in accordance with an illustrative embodiment of the invention.

With reference now to the drawing, FIG. 1 shows schematically and not to scale a diode 10 which can be operated to provide a negative resistance effect. It comprises the multizone semiconductive element 11, typically monocrystalline silicon, having a PIPININ resistivity profile, defined by zones 12, 13, 14, 15, 16, 17, and 18, and the electrodes 19 and 20, which make low resistance ohmic connections to the two terminal zones. Advantageously, the terminal zones 12 and 18 are of lower resistivity than any of the intermediate zones. In operation, electrode 19 is maintained positive with respect to electrode 20 by an appropriate D-C voltage source, whose intensity is such as to result in the desired avalanching in the zone 15.

A resistivity profile of this kind is best achieved by epitaxial techniques. Upon a crystal of low resistivity material, there are grown in turn epitaxial layers having the desired resistivity, the resistivity being controlled by the addition of suitable dopants to the gaseous atmosphere used for growing the desired layers.

For the purposes of analysis, the section formed by the five zones 12, 13, 14, 15 and 16 can be treated as an NINIP diode of the kind described in aforementioned application Ser. No. 550,547, and the section formed by the five zones 18, 17, 16, 15 and 14 can similarly be viewed as a PIPIN diode of the kind described therein.

In particular, in accordance with the principles set forth in such application for an NINIP, the zone 15 advantageously should be wider than the zone 14 but no wider than the zone 13. Similarly, in accordance with the principles for a PIPIN diode, the zone 15 advantageously should be wider than zone 16 but no wider than zone 17. In a typical design intended for use at frequencies between 8 and 12 gigahertz, the zones 12 through 18 may have thicknesses substantially as follows, recognizing, however, that the lines of demarcation are not necessarily sharp: 0.5 micron, 2.5 microns, 0.5 micron, 1.5 microns, 0.5 micron, 2.5 microns, and 10 mils. The cross section of the element typically would be 5 mils square.

Figure 2:
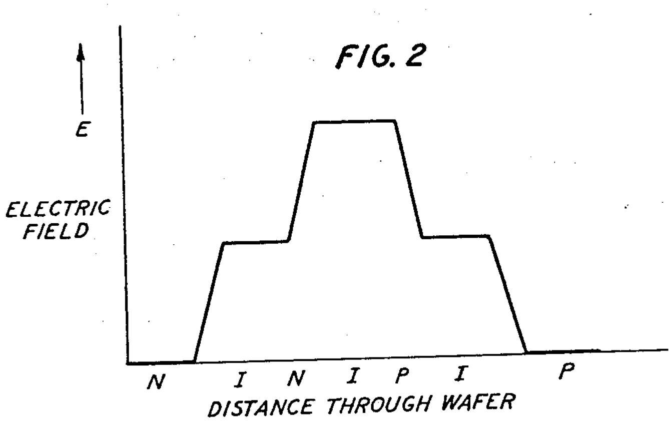
FIG. 2 depicts the electric field in the diode shown in FIG. 1.

In FIG. 2, the intensity of the electric field is plotted against distance in the element with the various zones shown along the abscissa. As can be seen, the field reaches its maximum intensity in the zone 15 which corresponds to the avalanche region of the device wherein are created the hole-electron pairs by impact ionization, the electrons being drawn to positive electrode 19 and the holes to negative electrode 20 and in the process passing through the corresponding drift regions separating the zone 15 from these electrodes. As previously indicated, it is advantageous that the holes and electrons experience substantially similar transit times for maximum efficiency.

Figure 3:
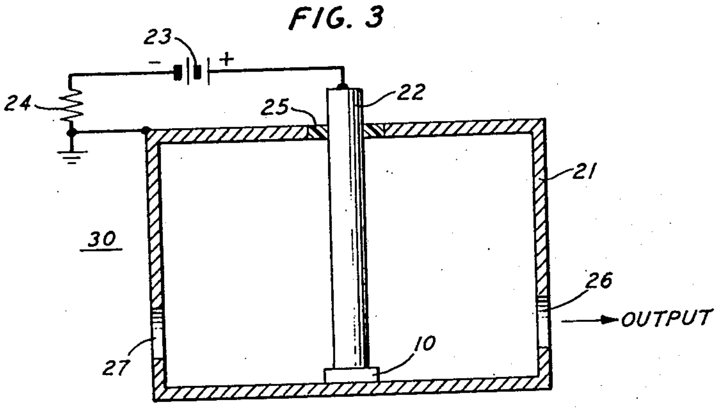
FIG. 3 shows schematically an oscillator incorporating a diode of the kind shown in FIG. 1.

FIG. 3 depicts schematically the basic elements of an oscillator 30 employing diode 10 to furnish a negative resistance. Except for the novel diode employed, the oscillator operates in a known fashion. The diode 10 is housed in a cavity 21 such that the assembly is resonant at the desired operating frequency. Of course, it is important that the diode exhibit a dynamic negative resistance at the desired frequency, and so it is dimensioned appropriately. The diode 10 is positioned between the conductive post 22 and the opposite wall of the guide whereby there results a path for direct currents which includes the D-C voltage source 23, the variable resistor 24, conductive post 22, the diode 10 and the wall of the guide which is connected to ground. To maintain D-C isolation between the guide wall and the post 22, with little effect on alternating currents, an insulating bushing 25 is provided where the post passes through the guide. An output iris 26 permits abstraction from the cavity of oscillatory power to permit its utilization.

In some instances, for example where the outputs of a number of oscillators are to be combined to increase the total power output, it may be desirable to inject a small amount of control power at the desired operating frequency to lock the oscillations in frequency and phase to such control power. To this end, there is shown an iris 27 by way of which such control power may be injected if desired. Of course, iris 26 can simultaneously function both as an output iris and as an injection iris by providing appropriate external circuitry in known fashion.

Voltage tuning is achieved by means of the variable resistor 24. Additionally, if found desirable, provision can be made for tuning the cavity by mechanical means in known fashion, or by the inclusion of additional electronic tuning mechanisms such as a varactor.

The basic arrangement described can also be used as a negative resistance amplifier. In this case, iris 27 would be employed to introduce the input signal to be amplified and iris 26 to abstract the amplified signal. Alternatively, the amplifier may be designed to employ only a single port in known fashion, utilizing a circulator to separate input and output signals. For use as an amplifier, the loading should be such as to suppress spontaneous oscillation.

It is to be understood that the specific embodiments described are merely illustrative of the general principles of the invention and that various other arrangements may be devised consistent with the principles described.

What is claimed is:

1. A semiconductive diode adapted for providing a negative resistance comprising a semiconductive element having an NINIPIP resistivity profile and a pair of electrode connections to the two terminal zones in combination with a voltage source for biasing the diode to a negative resistance operating point.

2. A semiconductive device adapted for providing a negative resistance comprising a semiconductive element having an NINIPIP resistivity profile and electrode connections to the two terminal zones, the intermediate zones being free of electrode connections.

3. A semiconductive device in accordance with claim 2 having only a single electrode connection to each of the two terminal zones.

4. A semiconductive device in accordance with claim 2 in combination with a voltage source for biasing the device to a negative resistance operating point.

5. A semiconductive device in accordance with claim 3 in combination with a voltage source for biasing the diode to a negative resistance operating point.

References Cited

UNITED STATES PATENTS 3,192,398 6/1965 Benedict.

JOHN KOMINSKI, *Primary Examiner.*